United States Patent
Hammersley (10) Patent No.: US 6,618,783 B1
(45) Date of Patent: Sep. 9, 2003

(54) METHOD AND SYSTEM FOR MANAGING A PCI BUS COUPLED TO ANOTHER SYSTEM

(75) Inventor: Peter J. Hammersley, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/430,369

(22) Filed: Oct. 29, 1999

(51) Int. Cl.[7] .............................................. G06F 13/14
(52) U.S. Cl. ......................................... 710/305; 714/10
(58) Field of Search ................................. 710/300, 301, 710/302, 303, 304, 305, 306; 714/10, 11, 12, 13, 14, 41

(56) References Cited

U.S. PATENT DOCUMENTS

| | | | | |
|---|---|---|---|---|
| 5,834,856 A | * | 11/1998 | Tavallaei et al. ............... 307/64 |
| 5,978,932 A | * | 11/1999 | Nishiyuki et al. ............. 714/11 |
| 6,035,355 A | * | 3/2000 | Kelley et al. ................. 710/302 |
| 6,112,271 A | * | 8/2000 | Lanus et al. ................. 710/306 |
| 6,138,247 A | * | 10/2000 | McKay et al. ................. 714/10 |
| 6,161,197 A | * | 12/2000 | Lanus et al. .................. 714/11 |
| 6,209,051 B1 | * | 3/2001 | Hill et al. .................... 710/302 |
| 6,351,452 B1 | * | 2/2002 | Koenig et al. .............. 370/217 |
| 6,425,094 B1 | * | 7/2002 | Drogichen et al. ........... 714/41 |

* cited by examiner

*Primary Examiner*—Sumati Lefkowitz
*Assistant Examiner*—X. Chung-Trans
(74) *Attorney, Agent, or Firm*—David M. Mason (57) ABSTRACT

The present invention provides a PCI bus switching architecture to allow a pair of PCI processors to have access to a common set of PCI I/O cards. More specifically, this design allows either cross-coupled processor to dynamically take over the operational controls of the common set of PCI I/O cards if the primary processor for the same become inoperative. The present invention achieves the objective by employing a point to point data link connection between each processor and their respective controllers for each common set of PCI I/O cards associated with a PCI bus.

20 Claims, 4 Drawing Sheets

METHOD AND SYSTEM FOR MANAGING A PCI BUS COUPLED TO ANOTHER SYSTEM

BACKGROUND OF THE INVENTION

1. Field of the Invention

This invention relates in general to high availability computer systems, and more particularly to a mechanism that enables peripheral component interconnect ("PCI") bus switching for high available computer systems.

2. Description of the Related Art

Computer systems are used increasingly for mission-critical applications that rely on the need for a high level of availability over time. As such, two or more computer systems are coupled together in order to ensure that the coupled system can sustain failures from power systems, disks, processors, network components, software, and the like. In this manner, the operation of the mission-critical application is uninterrupted in the event of such failures.

One area of concern for a high availability system is the ability to maintain I/O traffic between the system processor and the peripheral devices when a system failure occurs. A common solution to this problem is to provide one computer system with the capability to control the other computer system's peripheral devices in the event of a failure. Typically, the peripheral devices are connected to a peripheral component interface ("PCI") bus. The task then becomes one of PCI bus switching, that is allowing a non-failed computer system to take control of a failed computer system's PCI bus.

Figure 1:
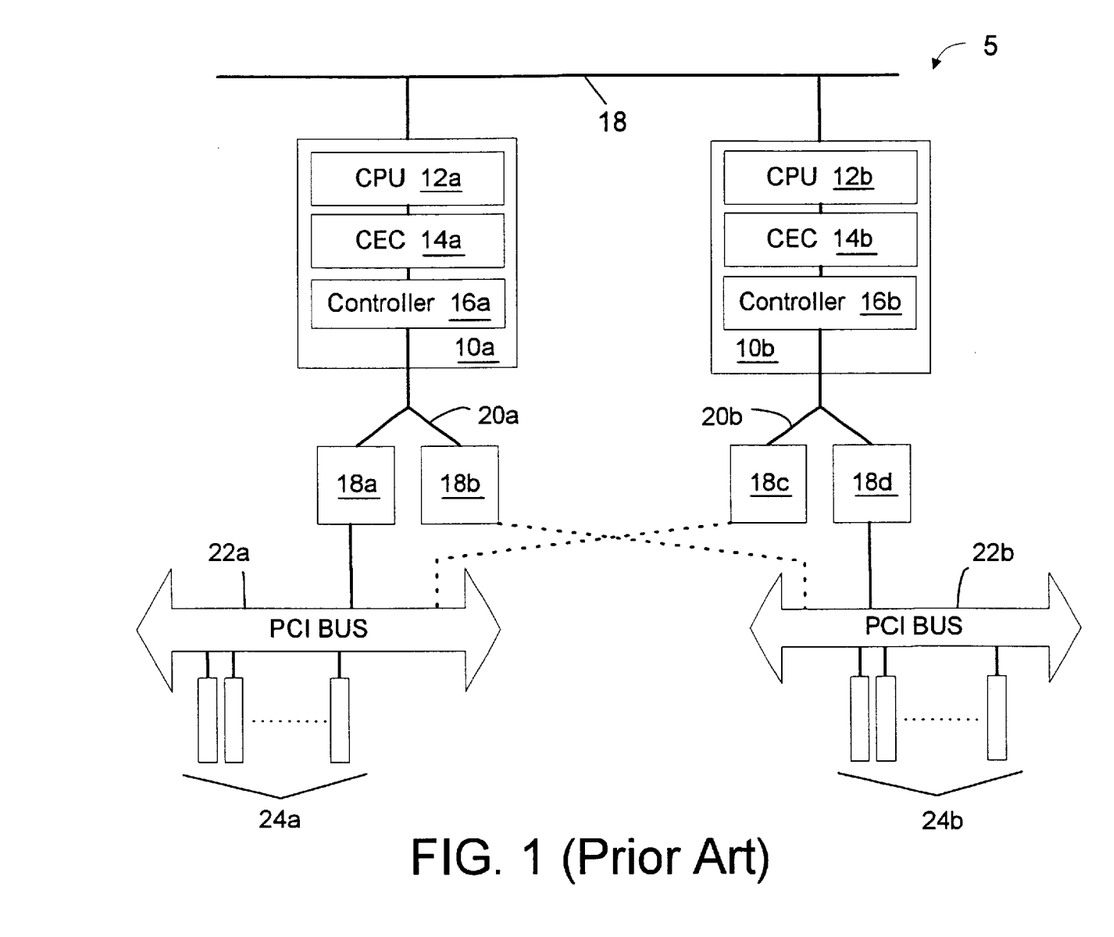
FIG. 1 illustrates a component layout of a conventional PCI bus switching implementation.

FIG. 1 illustrates one such PCI bus switching technique. As shown, there is a loosely-coupled computer system 5 having two processor boards 10a and 10b each having a CPU 12a–b ("central processing unit"), a complex electronic complex ("CEC") 14a–b, a PCI controller 16a–b, and two PCI bridges 18a–d. Each processor 10a and 10b can be selected from a chipset that will communicate with a PCI bus at 33 MHz, such as an Intel Pentium processor and its associated components.

The PCI buses 20a and 20b connect the controllers 16a and 16b to their respective PCI bridges 18a–d, and PCI buses 22a and 22b cross-connect each set of I/O cards 24a–b to a primary PCI bridge 18a, 18c and a secondary bridge 18b, 18d. Each PCI bus 20a–b and 22a–b has a fixed bandwidth of 133 MB/s. The secondary bridges 18b and 18d are not operational unless a primary bridge 18a, 18c or a processor 10a–b fails. In order for the PCI bridges 18a–d to allow implementation of the PCI bus switching, it must have the necessary hardware and software mechanisms to relinquish and acquire the PCI bus 22a–b at the appropriate times. In particular it must be able to manage the bus access arbitration, clock distribution, and reset logic.

There are several limitations with the architecture of the computer system shown in FIG. 1 that affects its PCI bus switching technique. For example, with the above system, the PCI bus 20a–b can not span more than 2 or 3 inches between the controllers 16a–b and the PCI bridges 18a–d because of PCI operational parameters. Consequently, this system can only be implemented in a single casing structure having room for closely spaced processor boards 10a–b, i.e., coupling multiple processor casing structures together to cross-connect their respective PCI buses would not be effective.

In addition, the use of a single conventional PCI bus 20a–b between the bridges 18a–d and the controllers 16a–b of each processor 10a, 10b delays the I/O traffic and reduces throughput on the PCI bus when a secondary bridge 18b, 18d has to take control of a failed primary bridge 18a, 18c or a processor 10a, 10b. For example, when one CPU 12b fails and the other CPU 12a acquires that failed CPU's PCI bus 22b, the data formally transferred over two PCI buses 20a–b to their respective CPU's is now shared on a single bus 20a. Consequently, a single bus operating with a fixed bandwidth of 133 MB/s is forced to mange twice as much data with half of the original 266 MB/s bandwidth available.

Accordingly, there is a need for a PCI bus switching technique that can overcome the aforementioned limitations.

SUMMARY OF THE INVENTION

In one aspect of the present invention, a computer system is provided wherein a first processor managing a first PCI bus acquires control of a second PCI bus coupled to a second processor. Each PCI bus couples to a set of I/O devices. A first and a second master hot swap controller ("mHSC") respectively couples to the first and second processor. A first, second, third, and fourth PCI controller respectively couples between the first PCI bus and the first mHSC, the second PCI bus and the second mHSC, the first mHSC and the second PCI bus, and the second mHSC and the first PCI bus. A first, second, third, and fourth data link respectively couples between the first PCI controller and the first processor, the second PCI controller and the first processor, the third PCI controller and the second processor, and the fourth PCI controller and the second processor. A first, second, third, and fourth slave hot swap controller ("sHSC") respectively couples between the first PCI controller and the first mHSC, the second PCI controller and the first mHSC, the third PCI controller and the second mHSC, and the fourth PCI controller and the second mHSC.

In another aspect of the present invention, a method is provided for implementing the above system. In particular, a method for a first processor that controls I/O traffic of a first PCI bus to acquire and relinquish control of a second PCI bus when a second processor for doing the same becomes inoperative and operative, respectively. Each processor includes at least one primary and back-up I/O controller. The process comprising the steps of: recognizing an inoperative state of the second processor to control a second PCI bus; deactivating the primary I/O controller of the inoperative second processor; activating the back-up I/O controller of the first processor; and managing the second PCI bus with the active back-up I/O controller of the first processor while the primary I/O controller of the first processor continues to manage the first PCI bus.

The above embodiments provide a computer system for effectively and efficiently switching a PCI bus from a failed or shut down processor to another processor already managing its own PCI bus(es). In particular, this invention provides a means to have a direct I/O traffic connection between each PCI bus and their controlling processor. This connection will not only help I/O traffic reduction due to throughput and speed issues related to conventional systems used for PCI bus switching, but it will also allow the PCI controllers up to 48 inches away from their controlling processor if desired and provide effective sharing between each system.

BRIEF DESCRIPTION OF THE DRAWINGS

Other aspects and advantages of the invention will become apparent upon reading the following detailed description and upon reference to the drawings, in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In general, the technology of the present invention provides an efficient and effective PCI bus switching mechanism utilizing at least two central processing units ("CPU") and at least two PCI buses each coupled to a set of I/O devices. More specifically, this invention provides a means for each CPU to manage one of the PCI buses during normal operation, while allowing either CPU to take over both buses if desired, such as when any component of the other system fails. This will be accomplished by eliminating the conventional PCI bridges 18a–d and buses 20a–b (see FIG. 1) typically used to communicate with the controlling processors which reduce bandwidth and/or the flow of I/O traffic through the data link used to communicate with one or more PCI buses and their respective I/O devices.

A bus can best be defined as an avenue for transferring data. A peripheral bus transfers data to and from peripheral devices. The first IBM PCs introduced in 1981, employed a peripheral bus known as ISA. These early models ran CGA graphics and DOS applications limited to several hundred thousand kilobytes. However, with the rapid development of video, local area networks ("LAN"), storage and Windows application that require greater I/O bandwidth, some functions of the ISA where replaced with the PCI bus.

The PCI bus was jointly developed to occupy an intermediate level between the CPU local bus processor/memory/cache subsystem) and a standard expansion bus (e.g., ISA). It was so effective that nearly all computer architectures today have an internal PCI bus. A more detailed description of the PCI bus can be found in Solari and Willse, *PCI Hardware and Software Architecture and Design*, 4th edition, Annabooks (1998), in Mindshare, *PCI System Architecture*, 3rd edition, Addison Wesley (1996), and in *PCI Specification rev. 2.1* from the PCI Special Interest Group (http://www.pcisig.com), each of which are hereby incorporated by reference as background information.

Generally, the PCI bus provides a 64-bit bus (most commonly implemented as a 32-bit bus) that can run at clock speeds of 33 or 66 MHz. At 32 bits and 33 MHz, the PCI bus can yield a throughput rate of 133 MBps. However, as with the ISA bus, there are limitations with the PCI bus that has led to various improved versions of the standard PCI bus. One such variation of the PCI bus is the Compact PCI bus or cPCI bus. This high performance industrial bus uses a 3U or 6U Eurocard board format and a high quality 2 mm metric pin-in socket connector. In addition, it provides a 32 or 64-bit synchronous data bus, a 32 bit address bus (4 Gigabytes total addressing), 133 or 266 Mbytes/s data transfer rate, multiprocessing capabilities, and bridging functionality from PCI to PCI or from PCI to other buses.

Compared to the PCI bus typically used with a standard desktop PC, cPCI supports twice as many PCI slots (8 versus 4) and offers a packaging scheme that is much better suited for use in industrial applications. In addition, the power and signal pins of the cPCI connector are staged so as to allow the specification to support hot swapping, a feature that is very important for fault tolerant systems and which is not possible on a standard PCI bus. A more detailed structural and operational description regarding cPCI or its feature of hot swapping can be found in the following references which are hereby incorporated by reference: "COMPACTPCI Specification", PICMG 1997 and "HOT SWAP Specification", PICMG 1998.

Figure 2:
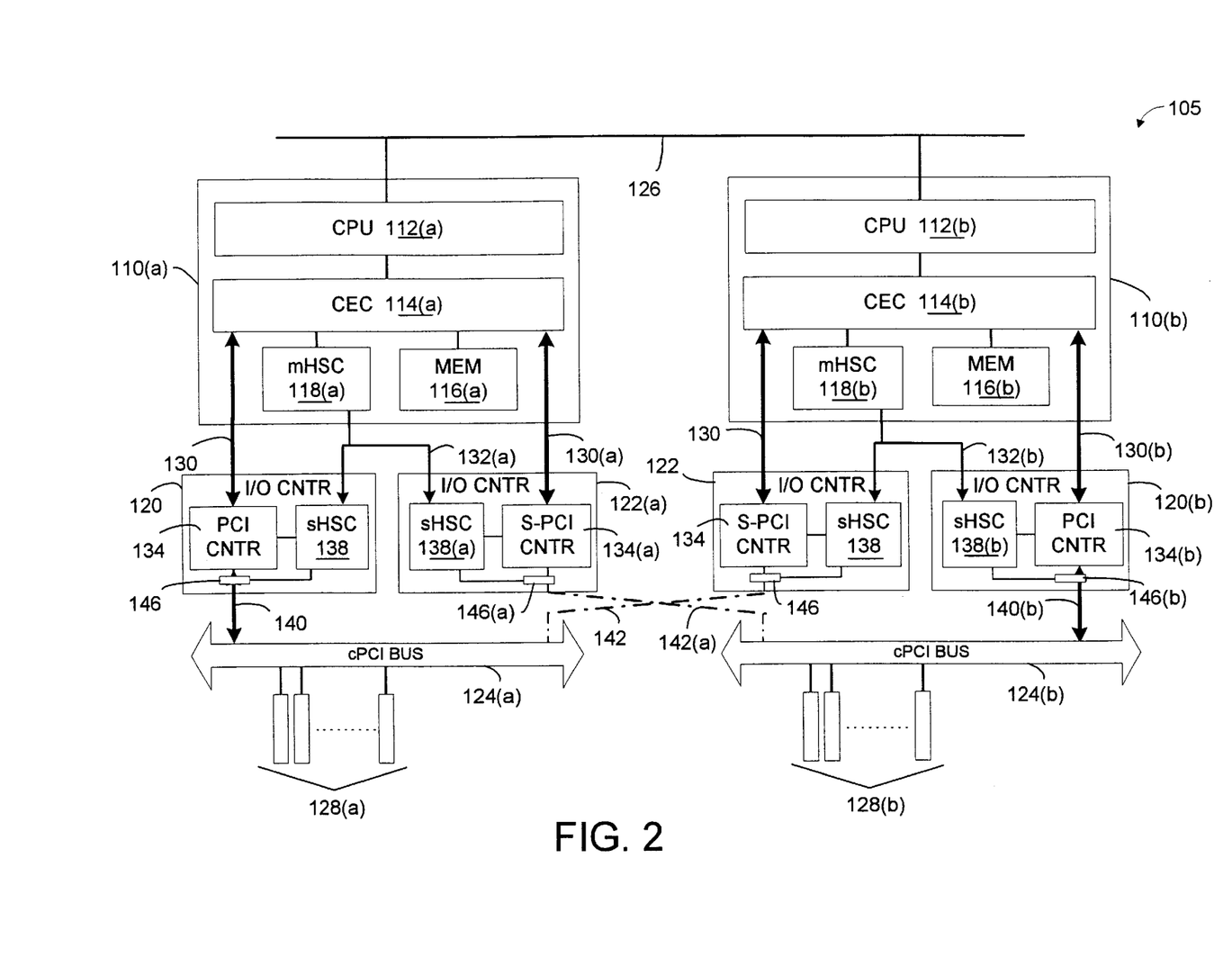
FIG. 2 illustrates a basic component layout in accordance to a preferred embodiment of the present invention.

Turning now to the drawings, a first preferred embodiment of the present invention is illustrated in FIG. 2. Within this embodiment, a computer system 105 includes two processor units 110, where each processor unit 110 is connected to a respective PCI bus 124 through one or more primary and back-up I/O controllers 120 and 122. The processor units 110 are coupled via an interconnect 126, such as a LAN, WAN, storage area network, or the like. The I/O controllers 120 and 122 manage the I/O traffic between the peripheral devices 128 and the processor units 110. One or more peripheral or PCI devices are connected to each PCI bus. A typical PCI device includes an I/O card or the like that enables the device to communicate in accordance with the PCI bus protocol.

Each processor unit 110 includes a CPU 112 coupled to a central electronic complex ("CEC") 114, a memory 116, a master Hot-Swap controller ("mHSC") 118, and at least one primary and back-up I/O controller 120 and 122. The CPU can be any type of processing unit such as but not limited to the Intel IA-32 or IA-64 microprocessors, HP's PA-RISC processor, or the like. The CEC provides an interface between the processor and the memory 116 and I/O controllers 120, 122. An example of a CEC is the Intel i840 and i440 chipset products. The memory 116 can be composed of any type of memory device such as but not limited to ROM, RAM, EEPROM, and the like, and any combination thereof. The master Hot Swap Controller ("mHSC") 118 provides an interface between the CEC 114 and one or more slave hot swap controllers ("sHSC") 138 that reside in each primary and back-up I/O controller 120 and 122. The I/O controllers 120 and 122 control the I/O traffic between the CPU 112 and the external peripheral devices 128.

The processor 110 includes a switch-over detection module (not shown) that monitors the "life signs" of coupled CPUs 112. In a preferred embodiment, the functions of the detection module will be handled by software such as HP's MC/ServiceGuard. However, a skilled artisan will appreciate that other software or hardware that can provide similar functions could be used instead.

To allow the I/O traffic to pass from a processor 110 to its PCI bus 124 at a high speed and throughput, there are dedicated point to point data path ("PtP) connections 130 that couple the CEC 114 to each I/O controller 120, 122, specifically to their PCI controller 134. The PtP connections 130 are used solely to transmit data to and from the peripheral devices 128. The mHSC 118 communicates with the CEC by a conventional bus and with their respective sHSC 138 over a separate serial bus 132.

In a preferred embodiment, the point to point data path connection 130 will operate at speeds between 130 and 530 Mbytes/sec and be able to span up to 48 inches between the CEC 114 and the I/O controllers 120, 122. The specific hardware and software necessary to implement the preferred point to point data path connection with the above chipsets are disclosed in the following U.S. Patent applications assigned to Hewlett Packard and incorporated herein by reference: Ser. No. 09/232193 entitled "System For Bridging a System Bus With Multiple PCI Buses"; Ser. No. 09/218333 entitled "Asynchronous Input/Output Cache Having Reduced Latency"; Ser. No. 09/232293 entitled "System and Method for Managing Data in an I/O Cache"; Ser. No. 09/232194 entitled "System and Method for Managing Data in an Asynchronous . . . "; Ser. No. 09/232505 entitled "System and Method for Managing Data in an Asynchronous . . . "; Ser. No. 09/218226 entitled "System and Method for Performing Memory Fetches . . . "; and Ser. No. 09/198833 entitled "Bus Bridge and Method for Ordering Read and Write . . . ".

The use of the PtP connections 130 allows for the elimination of functionally limiting PCI bridges 18a–d of the prior art. Consequently, with the inventive computer system 105, the peripherals 128 can be cross coupled directly to the I/O controllers 120 and 122 via a cPCI bus extension 140 and 142 so that each either processor 110 can have direct access to both cPCI buses 120, if desired.

To better understand the necessity of the PtP and the serial bus connections 130 and 132, the basic components of the primary and back-up I/O controllers 120 and 122 will now be discussed.

As mentioned earlier, each I/O controller 120 and 122 includes a PCI controller 134 and a slave Hot Swap controller ("sHSC") 138. In addition, each I/O controller 120 and 122 provides a switch 146, such as a series of field effect transistors, coupled between the sHSC 138 and the bus extensions 140 and 142 that couples the PCI controller 134 to the cPCI bus 124. Each PCI controller 134 includes a "watch dog" module that receives a signal from its respective processor 110 to indicate when the processor 110 is active. The switch 142 controls the flow of I/O traffic through each I/O controller 120, 122 that is generated from the cPCI bus 124 or the processor 110. The switch 142 functions when the sHSC 138 is instructed by either the master Hot Swap controller 118 or the PCI controller 134 to do the same. A more detailed description of the specific process will follow below.

Initially, the back-up I/O controller 122 is physically connected to a respective cPCI bus 124 but is not configured to access the cPCI bus 124 until the PCI controller 134 is instructed to take control of cPCI bus 124.

Under normal processing of the computer system 105, I/O traffic (e.g., I/O read and write operations) will only travel between a first cPCI bus 124 and a first processor unit 110.

In particular, I/O traffic from/to a first cPCI bus 124 and associated I/O devices 128, travels directly through a PCI controller 134 and PtP connection 130 to/from the CEC 114 of the first processor 110. However, if the initial operating state has been jeopardize by the failure of a processor or by a user request, than the I/O traffic typically destined for the failed processor will be routed to another processor 110, via the first processor's back-up I/O controller 122. Because of the point to point data path connection 130 that each back-up I/O controller 122 shares with its processor 110, even when a initial processor fails, the speed and throughput of the I/O traffic for the same will not change.

The foregoing has described the architecture and components of the computer system employing the technology of the present invention. Attention now turns to a description for the operation of the computer system when PCI bus switching is desired. With this invention, the steps for creating such a data path transition are identical if any processor is going to take control of a PCI bus typically controlled by another processor. Consequently, for the following example, it will be assumed that a second processor unit 10b of the computer system 105 has failed, and a first processor unit 10a will have to activate its back-up I/O controller 122a to take control of the second cPCI bus 124b.

Figure 3:
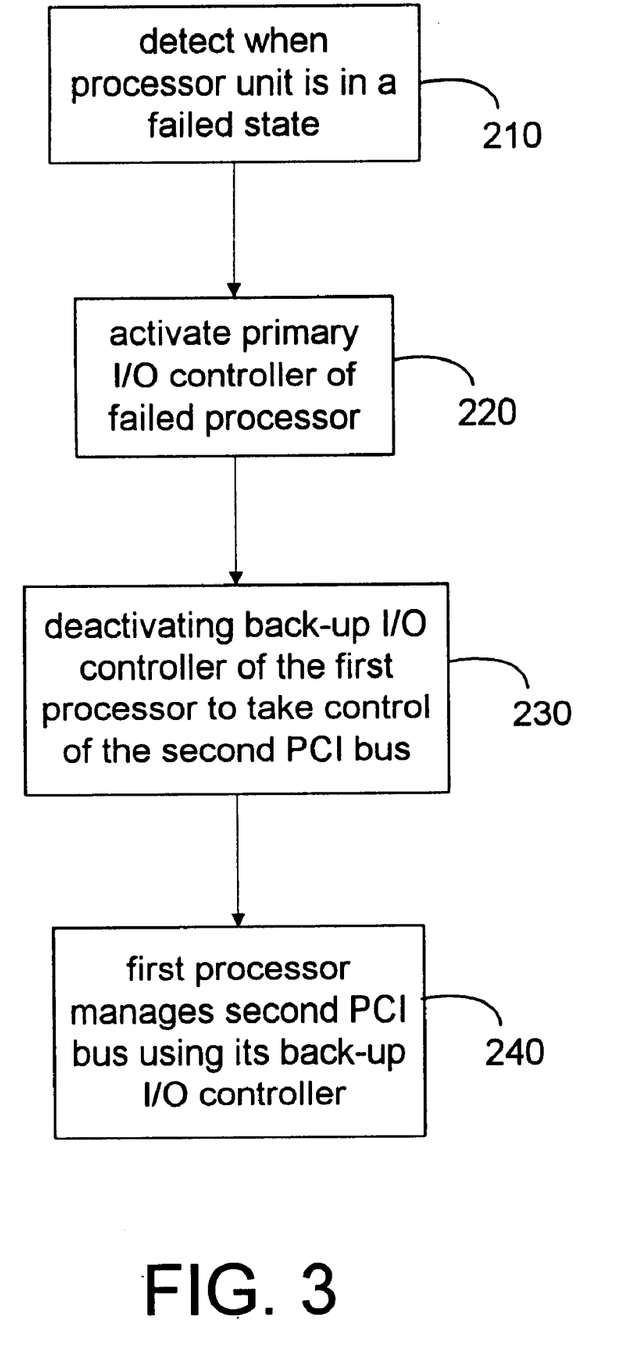
FIGS. 3 and 4 illustrate a basic flow chart outlining a method in accordance with the present invention for obtaining and relinquishing control of a cPCI bus coupled to a failed system.

Referring now to FIG. 3, the first step of the inventive PCI bus switching implementation involves "detecting when a processor unit is in a failed state" 210. A failed state can occur when any of the components of the processor unit has encountered an error that is of a catastrophic nature. When this occurs, the watch dog module within the PCI controller 134 times out. As mentioned earlier, by the module timing out, the primary I/O controller 120 will know that the second processor 110b has failed. At nearly the same time, the detection module (not shown) for the first processor 110a will recognize, by a similar method (e.g., HP's MC/ServiceGuard), that the second processor 110b has failed. The first processor will then activate a transition timer being set to indicate when a back-up I/O controller of the first processor can take control of the second PCI bus.

Since the PCI controller 134b detected that the second processor unit failed, the next step involves the "deactivation of the primary I/O controller 134b of the failed processor 110b" 220. To do this, the PCI controller 134b will send a signal to the slave Hot Swap controller sHSC 138b of the primary I/O controller 120b. The signal is routed to the salve HotSwap controller 138b through the CEC and the master HotSwap controller. The master HotSwap controller routes the signal to the intended slave HotSwap controller. The signal instructs the sHSC 138b to deactivate the FET 146b of the primary I/O controller 122b. By deactivating the FET 146b, the PCI controller 134b will be put into a high impedance state to prevent the flow of I/O traffic through the primary I/O controller 120b to/from the now failed second processor 110b.

With the flow of I/O traffic being prevented from reaching the failed second processor 110b, the next step involves "activating the back-up I/O controller 122a of the first processor 110a to take control of the second PCI bus 124b" 230. To accomplish this step, the first processor 110a will instruct the sHSC 138a of the back-up I/O controller 122a, via the first processors 110a mHSC 118a and CEC 114a, to deactivate the FET 146a of the first back-up I/O controller 122a.

By activating the FET 146a, the high impedance state previously imposed on the PCI controller 134a will be removed. Therefore, the first back-up I/O controller 122a will allow I/O traffic to travel to/from the second cPCI bus 124b and the first processor 110a. This in turn will allow the "first processor to manage the second PCI bus with its back-up I/O controller 122a" 240 while continuing to manage the first PCI bus 124a with its' primary I/O controller 120a. Once again, because of the dedicated point to point connections 130 between each I/O controller 120 and 122, the speed and throughput of I/O traffic should not change when passing between either PCI bus 124 and processor 110.

Figure 4:
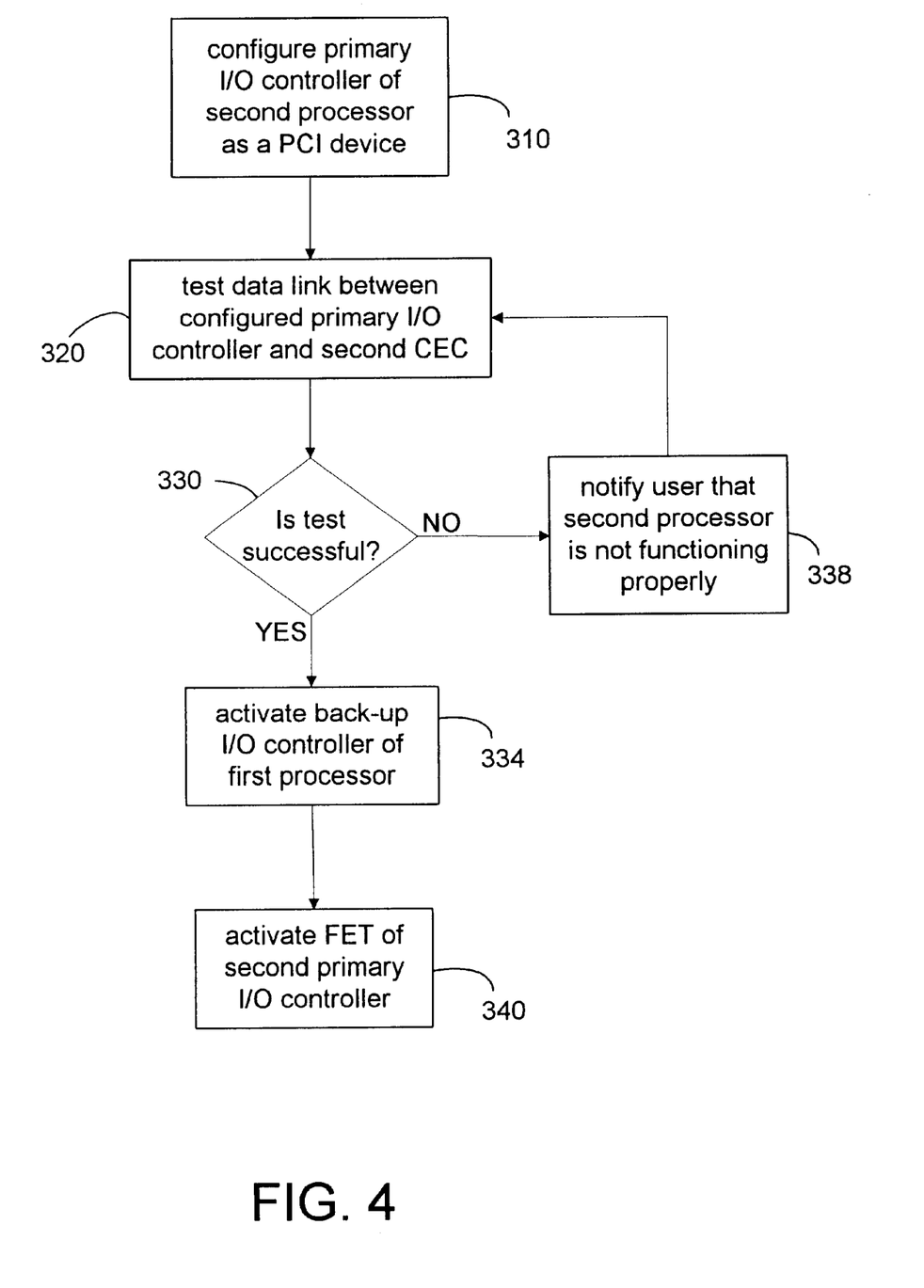

Once the user has fixed the catastropic problem that caused the failure, the failed processor will need to be incorporated back into the computer system 105 so that it can operate in a normal or an initial operating configuration. Consequently, the following steps as illustrated in FIG. 4 will recite how the first processor 110a can relinquish control of a back-up I/O controller 122a so that the primary I/O controller 120b of a now operational second processor 110b can resume control of the second cPCI bus 124b.

In order for the primary I/O controller 120b of the second processor 110b to be incorporated back into the computer system 105, the second processor 110b will first "configure the primary I/O controller 120b of the second processor 110b as a PCI device" 310 using a conventional method. Next, a conventional program will "test the data link between the configured primary I/O controller 120b and the second CEC 114b" 320 using the point to point data path 130b coupled therebetween.

If the "test is successful" 330, the second processor 110b instructs the first processor 110a to "deactivate the back-up I/O controller 122a of the first processor 110a" 334. The second primary I/O controller 120b is reconfigured for normal operation by a conventional method.

On the other hand, if the "test is not successful" 330, the second processor 110b will "notify the user that the second processor is not functioning properly" 338. At such time, the user can continue repairs to the failed second processor 110b or try the above procedures another time.

Assuming that the test is successful, the first processor 110a will deactivate the back-up I/O controller 122a by first instructing the associated sHSC 138a, via the first mHSC 118a and CEC 114a, to deactivate the FET 146a of the first back-up I/O controller 122a. By deactivating the FET 146a, the first back-up I/O controller 122a will be put back into a high impedance state to thereby prevent the flow of I/O traffic from flowing between the second cPCI bus 124b and the first processor 110a.

Therefore, the last step involves the second processor 110b instructing the sHSC of the second primary I/O controller 120b, via the second mHSC 118b and CEC 114b, to "activate the FET 146b of the second primary I/O controller 120b" 340. As before, this step will remove the second PCI controller 134b from a high impedance state, and thereby allow the I/O traffic to flow through the second primary I/O controller 120b between the now operational second processor 110b and cPCI bus 124b.

During the operation of a cPCI bus, only one processor may control the bus at a time, so there is no concurrent shared peripheral access possible. However, the buses support the above mentioned test mechanism that allows the correct operation of the standby side of the cPCI bus to be verified. This ensures that when a processor, or transition board is replaced, it can be tested without disrupting the active operation of the bus.

In summary, the present invention provides a computer system for effectively and efficiently switching a PCI bus from one processor to another processor without limiting throughput and/or I/O traffic of the communication path for the same. This has been accomplished by eliminating conventional bridging devices and their PCI bus used to communicate between the controlling processor of a set of I/O devices. In particular, the present invention provides a point to point I/O traffic connection between each PCI bus and their controlling processor. This connection will not only help to prevent the reduction in throughput and I/O traffic during PCI switching implementations typical of conventional methods, but also increase operational distances, up to 48 inches, that can be obtained between a controlling processor and its PCI bus.

What is claimed is:

1. A method for a first processor that controls I/O traffic of a first PCI bus to acquire and relinquish control of a second PCI bus when a second processor for doing the same becomes inoperative, each processor includes at least one primary and back-up I/O controller, the process comprising:

recognizing inoperative state of the second processor to control a second PCI bus;

deactivating the primary I/O controller of the inoperative second processor by switching the primary I/O controller of the second processor into a high impedance state to thereby prevent the flow of I/O traffic between the second PCI bus and the second processor;

activating the back-up I/O controller of the first processor; and managing the second PCI bus with the active back-up I/O controller of the first processor while the primary I/O controller of the first processor continues to manage the first PCI bus.

2. The method of claim 1, wherein the step of deactivating further includes powering down the inoperative second processor by an external high availability mechanism.

3. The method of claim 1, further including powering down an inoperative peripheral device of the second PCI bus.

4. The method of claim 1, wherein the step of managing further includes providing a dedicated point to point connection for the I/O traffic of the first and second PCI bus to communicate with the first processor.

5. The method of claim 1, wherein the step of recognizing further includes a detection module of the primary I/O controller timing out to indicate that the second processor has failed or a component thereof.

6. The method of claim 1, wherein the step of recognizing further includes a detection module of the first processor timing out to indicate that the second processor has failed or a component thereof.

7. The method of claim 6, wherein the step of the first processor timing out further includes the activation of a transition timer being set to indicate when a back-up I/O controller of the first processor can take control of the second PCI bus.

8. The method of claim 1, further including configuring the primary I/O controller of the second processor as a PCI device after the step of managing.

9. The method of claim 8, further including testing the data path between the configured primary I/O controller and the second processor to ensure the first processor can relinquish control of the second PCI bus back to the primary I/O controller of the second processor without disrupting the I/O traffic of a second PCI bus.

10. The method of claim 8, further including deactivating the back-up I/O controller of first processor.

11. The method of claim 10, further including activating the primary I/O controller of second processor such that I/O traffic of the second PCI bus flow to the second processor.

12. A network switching architecture, comprising:

a first and a second processor coupled by an interconnect;

a first and a second set of I/O cards;

a first and a second PCI bus respectively coupled to the first and second set of I/O cards;

a first and a second master hot swap controller ("mHSC") respectively coupled to the first and second processor;

a first, second, third, and fourth PCI controller respectively coupled between the first PCI bus and the first mHSC, the second PCI bus and the second mHSC, first mHSC and the second PCI bus, and the second mHSC and the first PCI bus;

a first, second, third, and fourth data link respectively coupled between the first PCI controller and the first processor, the second PCI controller and the first processor, the third PCI controller and the second processor, and the fourth PCI controller and the second processor; and a first, second, third, and fourth slave hot swap controller ("sHSC") respectively coupled between the first PCI controller and the first mHSC, the second PCI controller and the first mHSC, the third PCI controller and the second mHSC, and the fourth PCI controller and the second mHSC.

13. The networking architecture of claim 12, wherein each data link is a high speed point to point data connection.

14. The networking architecture of claim 12, wherein each data link operates at speeds between 130 and 530 Mbytes/sec.

15. The networking architecture of claim 12, wherein each data link connection allows optimal communications between the first and second processors and each PCI controller while having a separating distance up to 48 inches.

16. The networking architecture of claim 12, wherein the first and second processor farther include a central processing unit ("CPU"), a central electronic complex ("CEC"), and memory.

17. The networking architecture of claim 12, wherein each data link operates at an optimal speed and bandwidth while the first processor operationally controls the first and second PCI bus.

18. The networking architecture of claim 12, wherein the first, second, third, and fourth HSC sources and terminates the interface between the first processor and the first PCI bus, the first processor and the second PCI bus, the second processor and the first PCI bus, and the second processor and the second PCI bus, respectively.

19. A method for a first processor that controls I/O traffic of a first PCI bus to acquire and relinquish control of a second PCI bus when a second processor for doing the same becomes inoperative, each processor includes at least one primary and back-up I/O controller, the process comprising:

recognizing inoperative state of the second processor to control a second PCI bus;

deactivating the primary I/O controller of the inoperative second processor;

activating the back-up I/O controller of the first processor;

powering down the inoperative second processor by an external high availability mechanism; and managing the second PCI bus with the active back-up I/O controller of the first processor while the primary I/O controller of the first processor continues to manage the first PCI bus.

20. A method for a first processor that controls I/O traffic of a first PCI bus to acquire and relinquish control of a second PCI bus when a second processor for doing the same becomes inoperative, each processor includes at least one primary and back-up I/O controller, the process comprising:

recognizing inoperative state of the second processor to control a second PCI bus;

deactivating the primary I/O controller of the inoperative second processor, activating the back-up I/O controller of the first processor;

powering down an inoperative peripheral device of the second PCI bus; and managing the second PCI bus with the active back-up I/O controller of the first processor while the primary I/O controller of the first processor continues to manage the first PCI bus.

\* \* \* \* \*

UNITED STATES PATENT AND TRADEMARK OFFICE
CERTIFICATE OF CORRECTION

PATENT NO. : 6,618,783 B1  Page 1 of 1
DATED : September 9, 2003
INVENTOR(S) : Peter J. Hammersley It is certified that error appears in the above-identified patent and that said Letters Patent is hereby corrected as shown below:

<u>Column 9,</u>
Line 37, delete "farther" and insert therefor -- further --

Signed and Sealed this

Twenty-second Day of March, 2005

JON W. DUDAS
*Director of the United States Patent and Trademark Office*